Jan. 7, 1936.  H. M. JENSEN  2,026,538

NOON INTERVAL CALCULATOR

Filed June 6, 1934

INVENTOR
*HENRY M. JENSEN*
BY
ATTORNEY

Patented Jan. 7, 1936

2,026,538

UNITED STATES PATENT OFFICE 2,026,538

NOON INTERVAL CALCULATOR

Henry M. Jensen, United States Navy

Application June 6, 1934, Serial No. 729,258

3 Claims. (Cl. 235—84)

(Granted under the act of March 3, 1883, as amended April 30, 1928; 370 O. G. 757)

This invention relates to a device for calculating the interval between a forenoon observation of the sun and the time at which the sun will be on the observer's meridian, when the position of the observer is being changed to the east or the west from the point at which the observation was taken.

It is the object of this invention to provide a simple device for making rapid calculations of the change in the noon interval introduced due to movement of the observer eastwardly or westwardly.

Figures 1, 2:
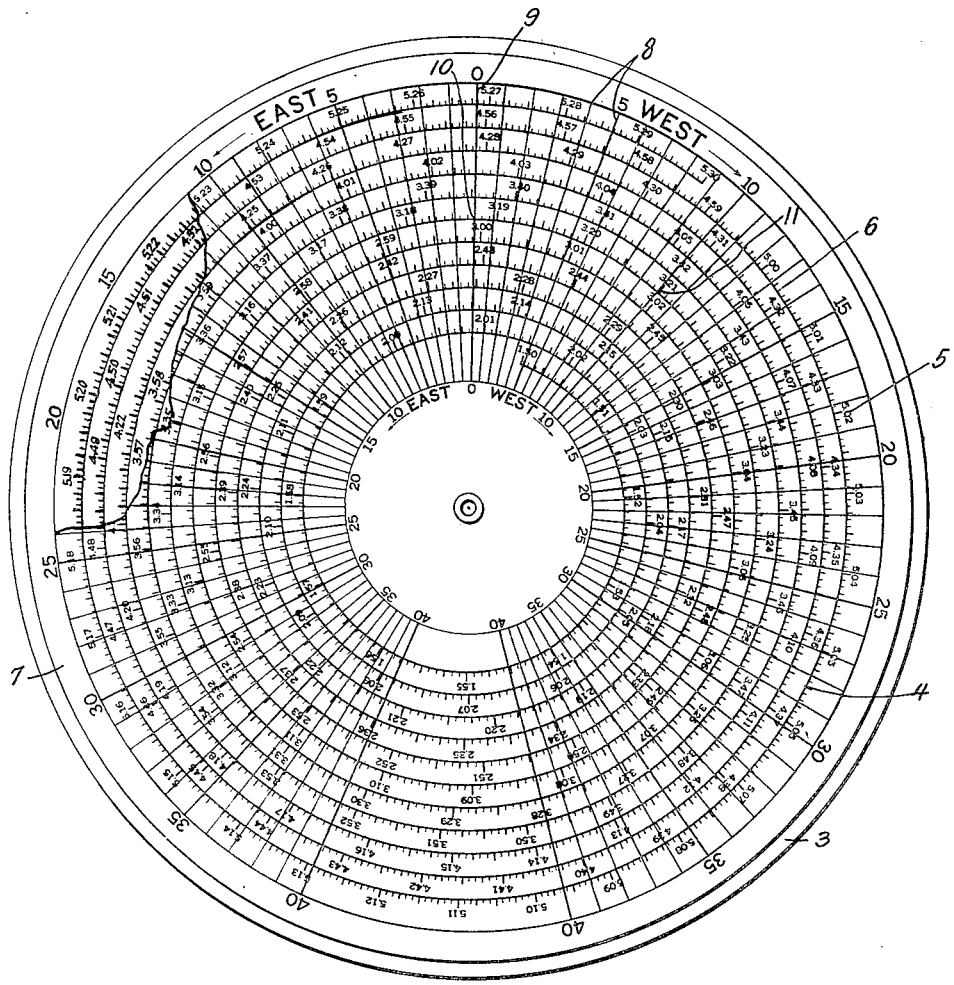
Fig. 1 is a plan view of my present invention.
Fig. 2 is a diametral section view thereof.

The base 3, which may be of any light, but sufficiently rigid, material has inscribed on it a spiral 4 that is divided into units 5 representing minutes of time and subdivided into lesser units 6 that are each proportionate to five seconds. The angular extent of each unit 5 from a radius representing zero time is proportionate to the logarithm of the number representing the number of minutes of time equal to the hours and minutes of the unit in question. The radius corresponding to zero time, and the spirals and units of time less than one hour and fifty minutes, are not shown on the drawing as units of time smaller than this are not normally used in calculating the interval to noon. This spiral represents local apparent hour angles of forenoon observations of the sun and extends from 1 hour 50 minutes at the inner end of the spiral to 5 hours 30 minutes at the outer end, though it may be extended in either direction. The spacing of the turns of the spiral is such that the linear distances represented by the divisions thereof are substantially constant throughout, thereby making the scale easily readable.

A transparent disk 7 is pivotally mounted at the origin of the spiral 4 and has inscribed on it spaced radial lines 8 representing departure in minutes of longitude per hour, the lines 8 being numbered in opposite directions from zero line 9 to designate departures to the east and the west, respectively. The angular spacing of the lines 8 is such that the space from zero line 9 to any of the lines 8 is proportional to the logarithm of the factor $$\left(\frac{900}{900 \pm \text{departure}}\right)$$

for the departure represented by such line, and, due to the outward angular divergence of the lines, the linear distances between the zero line 9 and any one of the lines 8 measured along any portion of the spiral is equal to the logarithm of the above factor for that departure. It is of course apparent to those skilled in the art that the scale on the spiral and that on the disk must be the same.

This instrument solves the problem presented by the equation:

Interval to noon=

Local apparent hour angle $$\times \frac{900}{900 \pm \text{departure}},$$

there being 900 minutes in 15°, the angular distance travelled by the sun per hour. The departure in minutes of longitude per hour is positive when easterly and negative when westerly. To compute the interval to noon from the time of a forenoon observation of the sun, the procedure is as follows: From the course and speed of the vessel compute the rate of departure in minutes of longitude per hour east or west either by use of tables or chart; set the zero line 9 to coincide with the mark on spiral 4 that represents the local apparent hour angle of the observation and under the line 8 on the disk corresponding to the computed rate of departure read the noon interval on the same turn of spiral 4 as the local apparent hour angle is found. The interval to noon thus obtained when added to the watch time of the forenoon observation will give the computed watch time of the local apparent noon. For example, suppose the local apparent hour angle is 3 hours 18 minutes and 45 seconds, and the departure is 10 minutes west. The zero line 9 is set to coincide with the mark on spiral 4 representing the local apparent hour angle, as shown at 10 in Fig. 1 and the same turn of the spiral is followed around until the spiral intersects the 10-minute line, west, on disk 7 at 11 where it is seen that the difference in the noon interval due to the change of position is the difference between 3 hours 18 minutes 45 seconds and, practically, 3 hours 21 minutes, which is 2 minutes 15 seconds. The interval to noon, 3 hours 21 minutes, when added to the watch reading at the time of the A. M. observation gives the watch time of local noon at the position of the observer.

The invention herein described may be manufactured and used by or for the Government of the United States of America for governmental purposes, without the payment of any royalties thereon.

I claim:

1. A computing instrument, comprising a base having thereon a spiral graduated in logarithmic angular intervals that represent local apparent hour angles at intervals of 1 minute and subdivided into intervals of 5 seconds, the linear distances between any two adjacent like unit division marks being substantially constant, and a transparent disk rotatably mounted on said base with its center at the origin of the spiral, said disk bearing spaced radial lines representing rates of departure in minutes of longitude per hour on opposite sides of a zero position, the angular space between the zero line and any other said radial line being a logarithmic function of the departure represented by such line.

2. A computing instrument, comprising a base having thereon a spiral graduated in logarithmic angular intervals that represent fractions of local apparent hour angles, and a transparent disk rotatably mounted on said base with its center at the origin of the spiral, said disk having on it, on opposite sides of a zero line, spaced radial lines representing rates of departure, the angular distance between the zero line and any other radial line being a logarithmic function of the departure represented by such other line.

3. A computing instrument, comprising a first member having on it, in uniform sequential relation, calibration marks representing logarithmic functions of time intervals so disposed that the linear distance between adjacent like unit marks is substantially constant throughout, and a movable member disposed over said calibration marks and having on it a sequential series of marks of considerable length converging to a common point, said converging marks being calibrated in both directions from a median zero mark, the linear spacing between any point on said zero mark and a point on any other of said converging marks, along a path at a constant distance from the said point of convergence, representing a time-dependent quantity, the said spacing at any point in the length of said marks being a function not only of the time-dependent quantity represented thereby but also of the total time interval represented by the distance between the beginning of the calibration marks on the first member and that one of said calibration marks that is brought into coincidence with such point, the said second member being movable to effect coincidence of any selected mark on said second member with any selected calibration on said first member.

HENRY M. JENSEN.